US012050716B2

(12) United States Patent
Spooner

(10) Patent No.: US 12,050,716 B2
(45) Date of Patent: Jul. 30, 2024

(54) PRIVACY PRESERVING EXPOSURE AND/OR ATTRIBUTION DETERMINATION BY MOBILE DEVICE

(71) Applicant: BILLUPS-SOS HOLDINGS, INC., Lake Oswego, OR (US)

(72) Inventor: Shawn Spooner, Beaverton, OR (US)

(73) Assignee: BILLUPS-SOS HOLDINGS, INC., Lake Oswego, OR (US)

( * ) Notice: Subject to any disclaimer, the term of this patent is extended or adjusted under 35 U.S.C. 154(b) by 297 days.

(21) Appl. No.: 17/354,264

(22) Filed: Jun. 22, 2021

(65) Prior Publication Data

US 2022/0405424 A1 Dec. 22, 2022

(51) Int. Cl.
*G06F 21/62* (2013.01)
*G06Q 30/0226* (2023.01)
*G06Q 30/0251* (2023.01)
*H04L 9/32* (2006.01)
*H04W 4/029* (2018.01)

(52) U.S. Cl.
CPC ..... *G06F 21/6254* (2013.01); *G06Q 30/0227* (2013.01); *G06Q 30/0261* (2013.01); *H04L 9/3221* (2013.01); *H04L 9/3247* (2013.01); *H04W 4/029* (2018.02)

(58) Field of Classification Search
CPC .. G06F 21/6254; G06F 21/62; G06F 21/6209; G06F 21/6218; G06F 21/6227; G06F 21/6245; G06F 21/6263; H04W 4/029; H04W 12/02; G06Q 30/0227; G06Q 30/0261; H04L 9/3221; H04L 9/3247
See application file for complete search history.

(56) References Cited

U.S. PATENT DOCUMENTS

| | | | | |
|---|---|---|---|---|
| 11,403,718 B1* | 8/2022 | Knox | ............ | G06Q 50/01 |
| 2017/0180928 A1 | 6/2017 | Sharma et al. | | |
| 2019/0236310 A1* | 8/2019 | Austin | ............ | G16H 10/60 |
| 2021/0150626 A1 | 5/2021 | Robotham | | |
| 2021/0226800 A1* | 7/2021 | Cao | ............ | H04L 9/3247 |
| 2022/0294768 A1* | 9/2022 | Frenklakh | ............ | H04L 63/0428 |
| 2022/0337392 A1* | 10/2022 | Schauer | ............ | H04L 9/3247 |

FOREIGN PATENT DOCUMENTS

WO 2020216792 A1 10/2020

OTHER PUBLICATIONS

Geopath "Geopath guidance and metrics related to COVID-19 traffic variations" New Geopath Data Solutions. <<https://geopath.org/wp-content/uploads/2020/04/New-Geopath-Data-Solutions_4-14-20.pdf>> Apr. 2020. pp. 1-2.
OAAA "OAAA OOH Impression Measurement Guidelines" <<https://oaaa.org/Portals/0/Public%20PDFs/Press/May2021_OOHImpressionsGuidelines.pdf >> May 2021. pp. 1-5.
European Search Report for European Application 22177723.8 mailed Nov. 21, 2022.

* cited by examiner

*Primary Examiner* — Malcolm Cribbs
(74) *Attorney, Agent, or Firm* — Lempia Summerfield Katz LLC

(57) ABSTRACT

For privacy-preserving attribution, the exposure and/or attribution to physical media (e.g., a surface or object) is determined on-board the mobile device. The exposure and/or attribution may be communicated remotely from the mobile device without passing specific locations and/or identifiers of the operator. The attribution information may be used by others without having access to private information, which never leaves the mobile device.

19 Claims, 3 Drawing Sheets

PRIVACY PRESERVING EXPOSURE AND/OR ATTRIBUTION DETERMINATION BY MOBILE DEVICE

BACKGROUND

The present embodiments relate to preserving privacy in a mobile device. Often, location data, identifiers, and other information considered private are used to provide services to the mobile device or to others. This private information is exported from the mobile device to provide the services. For example, attribution in physical media relates (a) exposure of an operator of the mobile device to the physical media to (b) a later visit to a location. Attribution currently requires accessing and storing huge amounts of location data, frequently this data includes personally identifiable information. This information facilitates attribution but also enables a host of other tracking activities that are not essential to measure effectiveness and can lead to abuses.

SUMMARY

By way of introduction, the preferred embodiments described below include methods, computer readable media, and systems for privacy-preserving attribution. The exposure and/or attribution to physical media (e.g., a surface or object) is determined on-board the mobile device. The exposure and/or attribution may be communicated remotely from the mobile device without passing specific locations and/or identifiers of the operator. The attribution information may be used by others without having access to private information, which never leaves the mobile device.

In a first aspect, a method is provided for privacy-preserving attribution. A travel path of a mobile device is identified by the mobile device. The mobile device determines exposure to a first object based on the travel path and determines a visit to a first location associated with the first object and after the exposure. The visit is also determined based on the travel path. An attribution of the visit of the mobile device to the first location is communicated to a server without communicating the travel path.

In a second aspect, a system for provided for privacy preserving exposure and/or attribution determination. A first server is configured to transmit jobs to mobile devices. The jobs are programs executable by the mobile devices based on travel paths of the mobile devices. A second server is configured to receive exposure records and/or visit records from the mobile devices. The exposure records and/or visit records are from execution of the programs using the travel paths. The exposure records and/or visit records do not include the travel paths and do not include an identifier of an operator of the mobile devices.

In a third aspect, a method is provided for privacy-preserving exposure and/or attribution. Calculation is performed based on longitude and latitude by a mobile device. The results of the calculation are communicated to a remote device remote from the mobile device. The communication is free of the longitude and latitude.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Private location observation is provided with validated exposures. The system accurately tracks exposure to physical media (e.g., sign) and how the exposure leads to visits to a location (e.g., physical stores or online websites). The tracking is provided without the need for any personal data to ever leave the mobile device. This protects the privacy of the individual while also allowing transparent tracking of exposure effectiveness.

A rules system for describing when an observation is recorded allows for fully private and anonymized tracking of visiting places in the physical world. The rules may be used for traffic and civil planning. For example, the exposure to a given intersection with subsequent attribution based on a visit to a neighboring location may be used to plan for street redesign. By crafting rules, the flow and/or relationship between locations in the traffic network may be determined without needing private information from mobile devices. Another use is out-of-home messaging, in which exposure to OOH messages is tracked. Exposures to messages leading to visits to stores or websites is measured. The effectiveness of a messaging campaign may be measured without jeopardizing the privacy and anonymity of individuals. In other examples, the rules system is used for population movement research. Unique programs may be executed on the unique location data on the mobile device without leaking any precise details about the identity or location of the device. On-device computation ensures that private data, including MAID, longitude, and latitude, stays private, by never allowing the data to leave the device.

Cryptography is used to track the provenance of data, including publicly tracking the owners of all assets on a blockchain with non-fungible tokens. All assets that are transmitted to and from the device are digitally signed. The cryptography allows for ownership of data. For example, the computing environment allows end-users to share in the rewards, such as money, earned by the platform.

Figure 1:
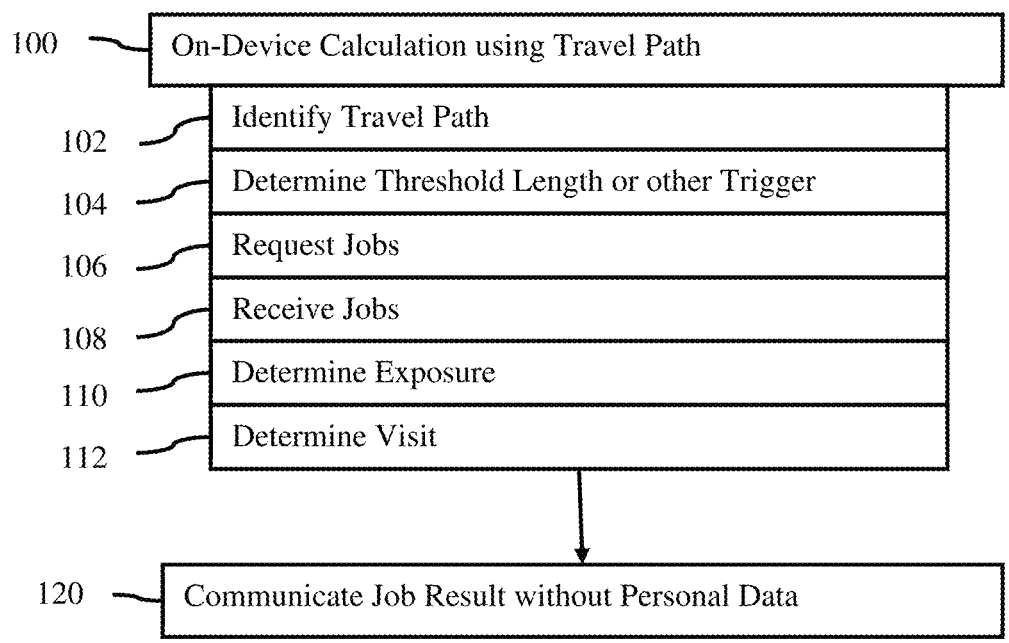
FIG. 1 is a flow chart diagram of one embodiment of a method for privacy-preserving attribution.
Figure 2:
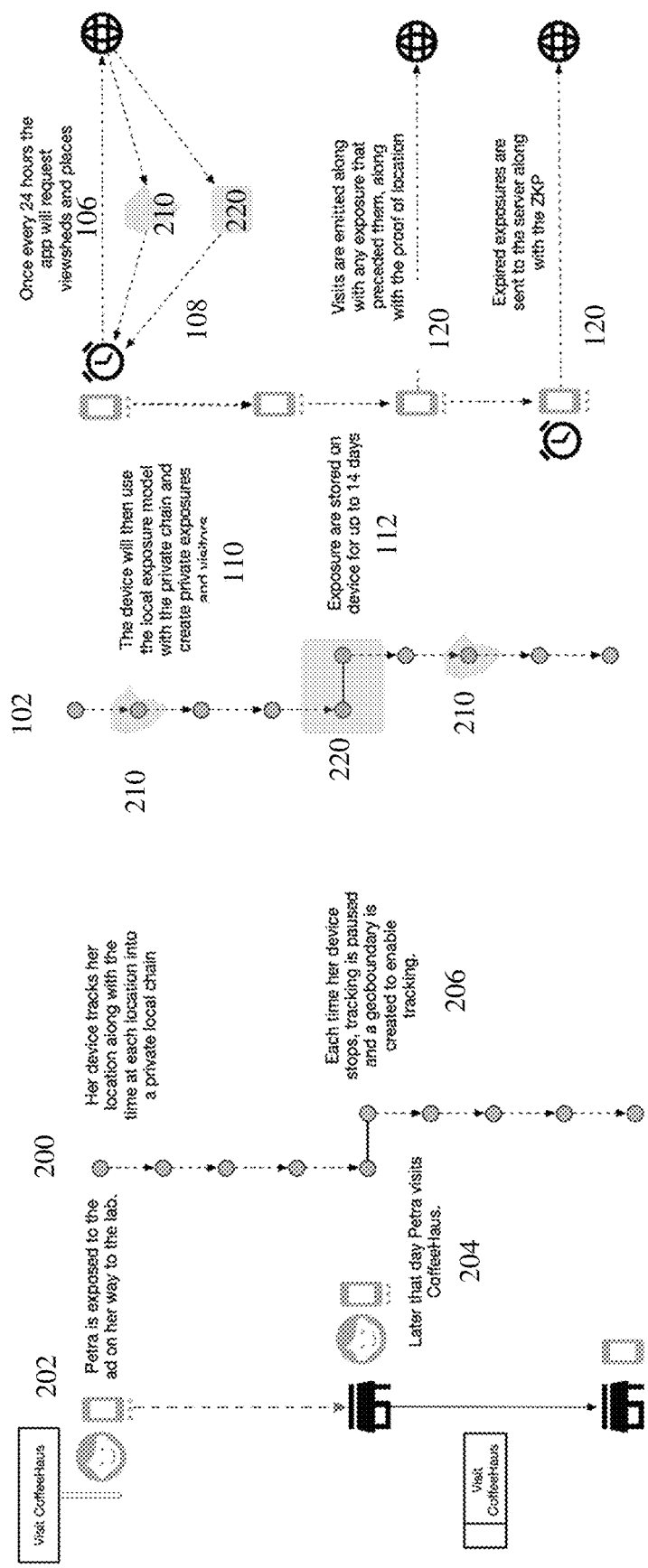
FIG. 2 illustrates an example of another embodiment of the method for privacy-preserving attribution.

FIG. 1 shows one embodiment of a method for privacy-preserving exposure and/or attribution determination. The mobile device determines exposure and/or attribution based on longitude and latitude samples along a travel path. Privacy is preserved by on-board computation and communicating the on-board determined exposure and/or attribution without communicating the travel path and/or other private data. FIG. 2 illustrates another embodiment of the method.

The methods of FIGS. 1 and 2 are implemented in the order shown (e.g., top-to-bottom, left-to-right, and/or numerical) or a different order. For example, acts 106 and 108 are performed prior to acts 102 and/or 104.

Additional, different, or fewer acts may be performed. For example, the acts of FIG. 1 are provided in the context of a mobile device. Acts performed by servers in support of the mobile device may be included. FIG. 2 represents some of those acts. As another example, act 104, 106, and 108 are not provided. In other examples, act 110 or act 112 is not provided, such as where the rules define exposure calculation without attribution to a visit.

Figure 3:
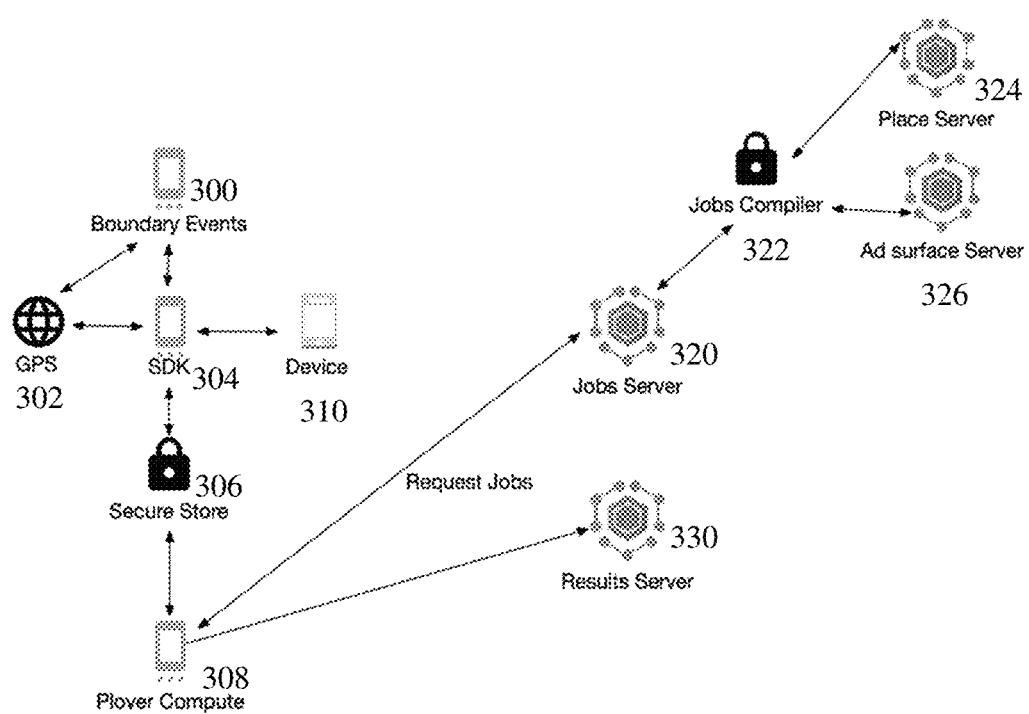
FIG. 3 is a diagram of one embodiment of a system for privacy-preserving attribution.

The method is implemented by the system of FIG. 3 or another system. The method may be implemented by a mobile device, such as a smartphone or tablet computer, with a processor, memory, and global navigation satellite system (GNSS) receiver (e.g., GPS antenna and processor). In one embodiment, the method is implemented by a processor using a non-transitory memory storing instructions executable by the processor.

In act 100, the mobile device performs calculation based on longitude and latitude. The calculation is on-device, so may use the travel path (e.g., longitude and latitude samples) and/or other private information. The mobile device executes a program, which uses the location information for the mobile device. For example, the program is a mobile application running on the mobile device.

The mobile application may allow user control for refinement of security and/or privacy in running jobs for exposure and/or attribution computation. For example, the user creates an allow list and a deny list of geographical areas for which the user will allow or deny the application from tracking and/or using their locations. The application may allow the user to view their travel path over a given range or time in order to see what is being recorded even on the mobile device. The application may allow the user to see the jobs run by the application, including a description of the jobs, for tracking how often their mobile device has run jobs using the travel path.

The calculation uses private data. For example, the calculation uses the travel path (e.g., sequence of longitude and latitude samples). In one embodiment represented in acts 102-112, the calculation is to determine exposure to a object and visitation of a location associated with the object. The exposure and/or the visitation determinations are based on the travel path, including the longitude and latitude, of the mobile device. In other embodiments, additional, different, or fewer acts are used for the on-device calculation of act 100.

In act 102, the processor of the mobile device identifies a travel path of the mobile device. The GNSS receiver, such as a GPS receiver, samples the locations over time of the mobile device. GNSS signals are used to measure the longitude and latitude of the mobile device. Other sources of location may be provided, such as signals from low earth orbit satellite constellation, cellular or other orbital or ground-based positioning systems. The processor identifies the travel path by causing measurements to be performed, by loading performed measurements from memory, or by otherwise accessing longitude and latitude measurements for the mobile device.

In one embodiment, the mobile application runs in the background listening for geographic events. The position of the mobile device is logged periodically (e.g., every 20 seconds), creating a travel path as a private local chain of positions. To save battery, a geofence may be created when the mobile device is not moving (i.e., no change in position over a given time). The tracking is then enabled again when the position shows that the geofence (e.g., circumference with a 10-meter radius) is crossed.

The mobile application identifies the private location chain (e.g., travel path). Since the mobile application operates on the mobile device, the application forms a computation environment as a fully private platform where programs or jobs can be sent to be executed over the private data. The results are verified, and only the safe, private results of the computation are shared remotely from the mobile device.

The jobs may be run in real-time, such as each new location is gathered. In other embodiments, the jobs are run based on another trigger. For example, the jobs are run at a given time or times each day, week, or other period, such as overnight when recharging is likely occurring. In act 104, the mobile device triggers the execution of jobs when the travel path is of a threshold length. The mobile device calculates a distance traveled and determines when the travel path is at or exceeds the threshold length.

Once the mobile device has traveled a maximum or threshold distance, then the jobs are performed. When the location chain is about to reach a max length, a new jobs request is sent to the jobs server in act 106, and, if any jobs are available, one or more jobs are received in act 108. The compute environment of the mobile device takes the job and executes the job (e.g., acts 110 and/or 112).

In act 106, the mobile device requests any jobs for regions in which the travel path occurred. Any region identification may be used. In one embodiment, the regions are 10×10 km. Larger or smaller regions, such as by zip code, may be used. The regions may have any shape, such as based on traffic networks. The mobile device determines the regions through which the current travel path passes. The jobs for those regions are requested. While some position information is given by the region-based requests, the specific longitude and latitudes remain private.

The jobs are executables or programs that include rules or instructions for on-board computation. For example, the jobs include viewsheds for messages (e.g., signs, surfaces, or other objects), footprints for locations (e.g., URL or URLs for a website or boundaries for a store), and any logic for using the viewshed, footprint, travel path, and/or other information to compute, such as computing exposure in act 110 or attributing a visit to the exposure in act 112.

A server compiles jobs. The jobs are from an attribution or exposure tracker. Jobs from different entities may be gathered. The jobs are created and/or collected.

In one embodiment, the jobs compiler (server) takes the messages (e.g., objects or other surfaces) and places (e.g., websites or stores) and turns them into valid compute programs as jobs. The programs are verified, ensuring that the returned values protect user privacy. Where multiple jobs are compiled, the overlapping viewsheds or visits footprints may be compressed into chunked regions. The compression groups the viewsheds or footprints so that the mobile device can co-process them in one pass over the local travel chain. Each location of the travel path is compared against the compressed viewsheds and/or footprints to avoid having to separately compare for each job. The chain is processed from start to end to preserve temporal sequencing (i.e., an exposure to an object (sign) at 7:00 am could lead to a visit to a coffeeshop at 10:00 am, but not the other way around).

Each job may define a general location filter that the computing environment will verify before it accepts a job. This region usually takes the form of a geographic boundary of at least 10 km squared, covering areas that that job is interested in investigating. If the filter passes, the proof of location is generated (e.g., a zero-knowledge proof of the viewshed and/or footprint) and the job is unlocked for providing the job in response to a request for the region. The mobile device computing environment can then choose to process the job and store the results for later delivery in act 120 or skip processing the offered job due to user preferences or limited available compute resources on the device.

The mobile devices to which jobs are provided may or may not be recorded. On completion of the job, the mobile device submits proof of work for the job to the server.

In act 108, the mobile device receives the jobs. For example, one or more viewsheds and one or more footprints associated with a given campaign are received.

The jobs may be received with one or more non-fungible tokens. Any non-fungible tokens may be used, such as based on blockchain or private-public keys. The token allows for ownership and/or verification of correct data. Various viewshed owners may participate in the system but retain ownership of their viewsheds through the use of tokens. In one example, the non-fungible token for a viewshed is formed from a unique identifier, such as an identification based on an OOHkey or another object (e.g., sign) identifier, a checksum for the viewshed, and a cryptographic token.

In one embodiment, the objects and their viewsheds are collected and tracked by a server. The objects and the viewsheds may be used in one or more jobs.

The viewsheds may be for various types of surfaces (e.g., signs). For example, static fixed or digital surfaces are provided. The viewshed is communicated in a way including a non-fungible token, which includes a checksum of the viewshed. The static spaces or signs (objects) may include messages linked with viewsheds and any exposure rules. The rules may be published to the mobile device over the air and may be published in a geographically limited fashion, such as only for regions in which the viewshed is located. Each creative (e.g., object or message) is signed with a unique identifier.

Another type of static space or object is a digital object, such as with a programmable display screen. Digital objects may have time bound slots with a creative identifier associated with each slot. The digital object displays different messages at different times, so each object is assigned a time-limited creative identifier. On the mobile device, any exposure is logged to the timebound creative. The location proof (e.g., a zero-knowledge proof) may include the temporal component as well as the viewshed, thus allowing the verifier to assert a position in time and space.

Another type of object is a moving surface. For example, an object may be on a mobile platform. The moving space uses a feed of data, including the longitude, latitude, time, bearing, and speed to be sent to the surface server periodically (e.g., every 12 hours). The server converts these positions into full-fledged viewsheds by time and registers them as surfaces or objects with a time bound for the jobs.

The location information for jobs associated with the objects may also include a token, such as a non-fungible token. The building footprints or footprints for Internet locations (e.g., website map) are tracked and linked to campaigns. The objects (e.g., viewsheds and signs) are similarly linked to campaigns, associating the objects to the locations. The token may include a checksum of the footprint of the location, allowing place owners to retain ownership of their digital assets and share them as part of this system. In one embodiment, the non-fungible token for the location or place includes an unique identifier, such as a PlaceKey, a checksum, and a cryptographic token. The location may be specified by the unique identifier, the footprint (e.g., a building boundary stored as a WKT shape), a name, a non-fungible token path, and the checksum.

In act 108, the mobile device receives the viewshed and the footprint for each campaign. The jobs may be received with the viewshed and footprint. The non-fungible tokens for each viewshed and footprint are received. The viewshed and footprint may be provided with or as part of the job. The non-fungible token and checksum may be used to verify that the viewshed and footprint are accurate. A zero-knowledge proof may be used in other embodiments.

The mobile device executes the received jobs. After verification of the received jobs, the mobile device executes the job locally. Acts 110 and 112 provide two examples.

In act 110, the mobile device determines exposure of the mobile device or an operator to an object (e.g., sign or message). The exposure is determined based on one or more rules, such as comparing each location in a travel path to a viewshed or comparing a viewshed to the travel path. The rules for exposure may include timing information. The time may indicate which viewshed to use in the comparison. The exposure is determined after receiving the job and based on the job.

The exposure may include various information, such as a time of the exposure, an identifier of a campaign for the object, an identifier for a message of the object, and an identifier of the object. Other information for a determined exposure event may be created. The exposure event information does not include private data, such as the travel path, longitude and latitude, MAID, and/or another identifier of the mobile device or the user of the mobile device.

In one embodiment, when a mobile device has entered into the viewshed, the exposure model emits a positive signal. The mobile device logs an exposure event locally. The device can check the checksum of the viewshed against the checksum of the non-fungible token for validation. The logged exposure event may include an expiration date (e.g., a date when the exposure event will expire and be removed from the on-device cache), the unique identifier of the campaign, the unique identifier for the message, a unique identifier for this viewshed, a location proof, and a list of domains allowed to query if the device was exposed. The location proof is a zero-knowledge proof, such as a curve or pattern calculated based on the viewshed. A digital signature may be used to assert that the computation of the exposure is valid without leaking any details of the specifics of the exposure calculation (e.g., without providing the travel path).

The exposure event is stored on the mobile device. For example, the campaign identifier, creative identifier, exposure timestamp, the object identifier, the expiration date, and the signature and message are stored. The mobile application signs the locations that trigger an exposure before being logged or stored. This digital signature binds the object data and location together in a way allowing verification without uncovering the source.

In act 112, the mobile device determines a visit to a location associated with the first object and after the exposure. A visit to a store or other physical location (e.g., a park) is determined. Alternatively, a visit to a website or URL location is determined.

In one embodiment, the visit is determined based on the travel path of the mobile device. Where the travel path intersects with the footprint for the location, the mobile use is found to have visited the location. One or more rules may be used to determine the visit and/or to attribute the visit to the exposure. The rule may indicate timing, such as only counting visits that occur within 4 hours of exposure to an object or only counting visits with sufficient dwell time at the location. Other rules may be used.

Information associated with the visit may be determined. For example, a time of the visit is determined. The identifier of the campaign associated with the visit and the identifier of the location may be determined as part of identifying that a visit occurred.

The visit is determined after receiving a job for the campaign, object, location, or creative. The visit is determined based on or executing a received job.

In one embodiment, when activating a visit, the mobile device checks if a log of exposure is present and signed for the campaign. If so, a visit event will be generated indicating attribution to the exposure and stored locally. The attribution event may have a cooldown period that will need to expire before the event is communicated in act 120. The cool down may protect privacy by separating reporting of the visit from the actual occurrence in time. If no exposure event is present on the device, the visit event will be generated indicating no attribution and stored locally. As part of the visitation event, the proof of visit circuit (e.g., zero-knowledge proof of the footprint) is computed and the proof will be attached to the event.

An example visit event with attribution includes an expiration date, a campaign identifier, a creative identifier, a proof of location (e.g., zero-knowledge proof based on the footprint), a digital signature, and an identifier of the location (e.g., PlaceKey). An example visit event with no attribution includes an identifier of the location, a proof of location, and the digital signature. Additional, different, or fewer types of information may be included. On expiration, the visit event with or without attribution is published to a server in act 120.

In one embodiment, the memory of the mobile device stores visit records and place or location records. For example, visits records are stored as the location identifier, the visit timestamp, the creative identifier (e.g., a list of all the creative identifiers to which the user was exposed to before visiting only populated by the campaigns that are marked as active for this space and intersect with exposures stored on the device), the campaign identifier (e.g., a list of all the campaign identifiers for which the user was exposed to before visitation, which can be more than one for consumer goods and are only added for campaigns that are active for this space), expiration data, and a signed exposure string (e.g., proof such as ZKP by the server without leaking in any information on the specific exposure location and/or time). A conversion chain digital signature to prevent duplication of visits may be included. The number of visits per campaign and/or exposures may be limited. Additional, different, or less information may be used.

The place records may include an identifier of the place (e.g., PlaceKey), the footprint (e.g., boundary in a lossy format based on H3 cells that form a covering over the building footprint stored as an ordered set of cell identifiers), a checksum, a non-fungible token address, a campaign identifier, and one or more URLs for the requestor or job originator. Additional, different, or less information may be used.

In act 120, the mobile device communicates the visit and/or exposure. The visit with or without attribution is communicated. The exposure with or without a visit is communicated. The visit and/or exposure records are communicated. The results of the calculations performed as part of the jobs are communicated to a remote deice.

The communication is to a server remote from the mobile device, such as communicating wirelessly to a cellular tower and from there over a computer network to the server.

The communication includes a proof, such as a zero-knowledge proof based on the viewshed or footprint. The proof may be used to verify without communicating location information. A digital signature may be used to secure the communications. A cryptographic token for the mobile device may be used to attest to the source of the exposure or visit records.

The communication from the mobile device does not include private information. For example, the travel path is not communicated. There is no longitude or latitude information communicated. While the creative identification and place identification generally indicate locations to which the mobile device travelled, the specifics of those locations are not provided beyond somewhere in the viewshed and somewhere in the footprint. Further, the identification of the operator of the mobile device is not communicated. For example, the attribution in the form of a visit event is communicated without a mobile advertising identification (MAID).

By using the tokens, the mobile device may own the reported events or records. As a result, payments for the information may be provided to the mobile device. The tokens are relied upon to verify to whom the payment should be sent. By using tokens in the computing environment of the mobile device and exchanging the tokens with the jobs server without binding to the results, remuneration for the computing time and effort may flow back to the owner of the device.

With reference to FIG. 2, the mobile device travels along a travel path 200, which path is sampled. As part of the travel, the mobile device is within a viewshed 210 of a sign 202. In this example, the sign is to visit CoffeeHaus. Later, the mobile device visits the CoffeeHaus store 204. Each visit is tracked in act 206. The mobile device requests jobs from a server in act 106. The server provides the viewshed 210, footprint 220, and any other job information in act 108. The travel path 200 is identified in act 102 and compared to the viewshed 210 in act 110. The travel path 200 is also compared to the footprint 220 in act 112. In act 120, the results of executing the job are provided. For example, exposures and visits without attribution are communicated. As another example, visits with attribution are communicated.

FIG. 3 shows one embodiment of a system for privacy preserving exposure and/or attribution determination. The system implements the method of FIG. 1, the method of FIG. 2, or another method. Communications from the mobile device 310 to any server 320, 330 is limited and does not include the travel path, identifier of the user of the mobile device, or other private information. By processing for exposure, visits, and/or attribution on the mobile device 310, private information is not needed while still allowing the servers access to information to show effectiveness of signage or to acquire information used in studies or planning.

The system includes the mobile device 310 and one or more servers 320, 324, 326, and 330. While shown as different servers, any of the servers, including all of the servers, may be combined or implemented on the same device (e.g., one server or computer implementing the jobs and results functions). One mobile device 310 is shown, but many more mobile devices may be provided for interacting with the same servers.

The mobile device 310 is a smartphone, tablet computer, or other mobile device. In one embodiment, the mobile device includes a GPS receiver 302, a memory 306, and an application 304 (e.g., software development kit). The application 304 uses locations from the GPS receiver 302 to detect boundary crossing events 300, such as traveling into a viewshed or footprint. By computation 308, records are stored in the memory 306 for then communicating to the results server 330. The application 304 receives jobs from the jobs server 320 in response to requests from the application 304 or based on pushing by the jobs server 320.

The servers 320, 324, 326, and 330 are computers or workstations. Other types of servers may be used. The place server 324 manages the location information for one or more campaigns, such as managing the footprints and tokens for various stores and/or websites. The surface server 326 manages the object or message information for one or more campaigns, such as managing the viewsheds, messaging, timing, or other information for various signs.

The jobs compiler 322 operates on the jobs server 320 to collect or form jobs using the object information from the surface server 326 and the location information from the place server 324. The jobs server 320 is configured by software, hardware, and/or firmware to transmit jobs to mobile devices 310. The jobs include programs executable by the mobile devices 310 based on travel paths of the mobile devices. In one embodiment, the jobs include viewsheds with non-fungible tokens and footprints with non-fungible tokens. The jobs sever 320 then communicates the jobs to the mobile devices 310 based on region information received from the mobile devices and/or based on the cellular towers currently or over a period in communication with the mobile device 310.

The results server 330 receives the records from the mobile device 310, such as receiving exposure and/or visit information. In one embodiment, the results server 330 is configured by hardware, software, and/or firmware to receive exposure records and/or visit records from the mobile devices. The exposure records and/or visit records are from execution of the programs of the jobs using the travel paths. The exposure records and/or visit records do not include the travel paths and do not include an identifier of an operator of the mobile devices (e.g., no MAID). The exposure records and/or visit records include zero knowledge proofs based on the viewsheds and/or footprints or other proofs to verify authenticity of the records determined by the mobile device. The records received may also include digital signatures for further verification.

The memory 306 and/or memories of the servers 320, 324, 326, 330 may be non-transitory computer readable storage media. Instructions for execution by processors are stored therein. The instructions are for performing the methods described herein, such as instructions on the memory 306 for implementing the application 304 and/or performing the jobs provided from the jobs server 320.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for privacy-preserving attribution, the method comprising:
   identifying a travel path of a mobile device by the mobile device;
   receiving, by the mobile device, a viewshed and a footprint, the viewshed and the footprint each including a unique cryptographic identifier;
   determining, by the mobile device, exposure to a first object based on the travel path and the viewshed for the first object;
   determining, by the mobile device, a visit to a first location associated with the first object and after the exposure, the visit determined based on the travel path and the footprint;
   generating a cryptographic attribution of the visit to the exposure to the first object, the cryptographic attribution cryptographically indicating, via a digital signature, a validity of the exposure; and
   communicating the cryptographic attribution of the visit of the mobile device to the first location to a server without communicating the travel path.

2. The method of claim 1 wherein identifying the travel path comprise measuring from global navigation satellite system signals.

3. The method of claim 1, wherein for each of the viewshed and the footprint, the unique cryptographic identifier includes each comprise a non-fungible token.

4. The method of claim 1 wherein determining the exposure comprises determining a time of the exposure, an identifier of a campaign for the first object, an identifier for a message of the first object, and an identifier of the first object, and wherein determining the visit comprises determining a time of the visit, the identifier of the campaign, and an identifier of the first location.

5. The method of claim 1 wherein communicating the cryptographic attribution further comprises communicating the attribution as comprising a zero-knowledge proof.

6. The method of claim 1 wherein communicating the cryptographic attribution further comprises communicating the attribution without a mobile advertising identification (MAID).

7. The method of claim 1 further comprising determining that the travel path is of a threshold length and requesting any jobs for regions in which the travel path occurred, wherein determining the exposure and the visit are performed after receiving the jobs and based on the received jobs.

8. The method of claim 7 wherein the jobs include viewsheds, including a first viewshed for the first object, and footprints, including a first footprint for the first location, wherein determining the exposure comprises determining the exposure based on the first viewshed, and wherein determining the visit comprises determining the visit based on the first footprint and a rule of a first job of the received jobs.

9. The method of claim 1 wherein determining the visit comprises determining the visit to a store.

10. The method of claim 1 wherein communicating the cryptographic attribution comprises communicating with a cryptographic token for the mobile device, and further comprising receiving, by the mobile device, payment for the attribution.

11. A method for privacy-preserving exposure and attribution, the method comprising:
    obtaining, a viewshed and a footprint, the viewshed and the footprint each including a unique cryptographic identifier;
    performing a calculation based on longitude and latitude by a mobile device;
    based on the calculation, the footprint, and the viewshed, generating a cryptographic attribution of the mobile device traversing the longitude and latitude to an exposure to a first object, the cryptographic attribution cryptographically indicating, via a digital signature, a validity of the exposure; and communicating results of the calculation to a remote device remote from the mobile device, the communicating being free of the longitude and latitude.

12. The method of claim 11 wherein performing the calculation comprises determining, based on the viewshed and the footprint, exposure to an object and visitation of a location associated with the object based on a travel path including the longitude and latitude of the mobile device, and wherein the cryptographic attribution further includes a zero knowledge proof free of communicating the longitude and the latitude and free of communicating an identification of an operator of the mobile device.

13. Non-transitory machine-readable media configured to store instructions thereon, the instructions configured to, when executed, cause a processor to implement privacy-preserving attribution by:
    identifying a travel path of a mobile device by the mobile device;
    receiving, at the mobile device, a viewshed and a footprint, the viewshed and the footprint each including a unique cryptographic identifier;
    determining, by the mobile device, exposure to a first object based on the travel path and the viewshed for the first object;
    determining, by the mobile device, a visit to a first location associated with the first object and after the exposure, the visit determined based on the travel path and the footprint;
    generating a cryptographic attribution of the visit to the exposure to the first object, the cryptographic attribution cryptographically indicating, via a zero-knowledge proof, a validity of the exposure; and
    communicating the cryptographic attribution of the visit of the mobile device to the first location to a server without communicating the travel path.

14. The non-transitory machine-readable media of claim 13 wherein the instructions are configured to cause the processor to identify the travel path by measuring from global navigation satellite system signals.

15. The non-transitory machine-readable media of claim 13 wherein the instructions are configured to further cause the processor to determine that the travel path is of a threshold length and requesting any jobs for regions in which the travel path occurred, wherein determining the exposure and the visit are performed after receiving the jobs and based on the received jobs.

16. The non-transitory machine-readable media of claim 15, wherein:
    the jobs include viewsheds, including a first viewshed for the first object, and footprints, including a first footprint for the first location; and
    the instructions are configured to further cause the processor to determine the exposure by determining the exposure based on the first viewshed, and wherein determining the visit comprises determining the visit based on the first footprint and a rule of a first job of the received jobs.

17. The non-transitory machine-readable media of claim 13, wherein, for each of the viewshed and the footprint, the unique cryptographic identifier includes a non-fungible token.

18. The non-transitory machine-readable media of claim 13, wherein the instructions are configured to further cause the processor to determine the exposure by determining a time of the exposure, an identifier of a campaign for the first object, an identifier for a message of the first object, and an identifier of the first object, and wherein determining the visit comprises determining a time of the visit, the identifier of the campaign, and an identifier of the first location.

19. The non-transitory machine-readable media of claim 13, wherein the instructions are configured to further cause the processor to communicate the cryptographic attribution further by communicating the attribution without a mobile advertising identification (MAID).

* * * * *